United States Patent Office 3,374,632
Patented Mar. 26, 1968

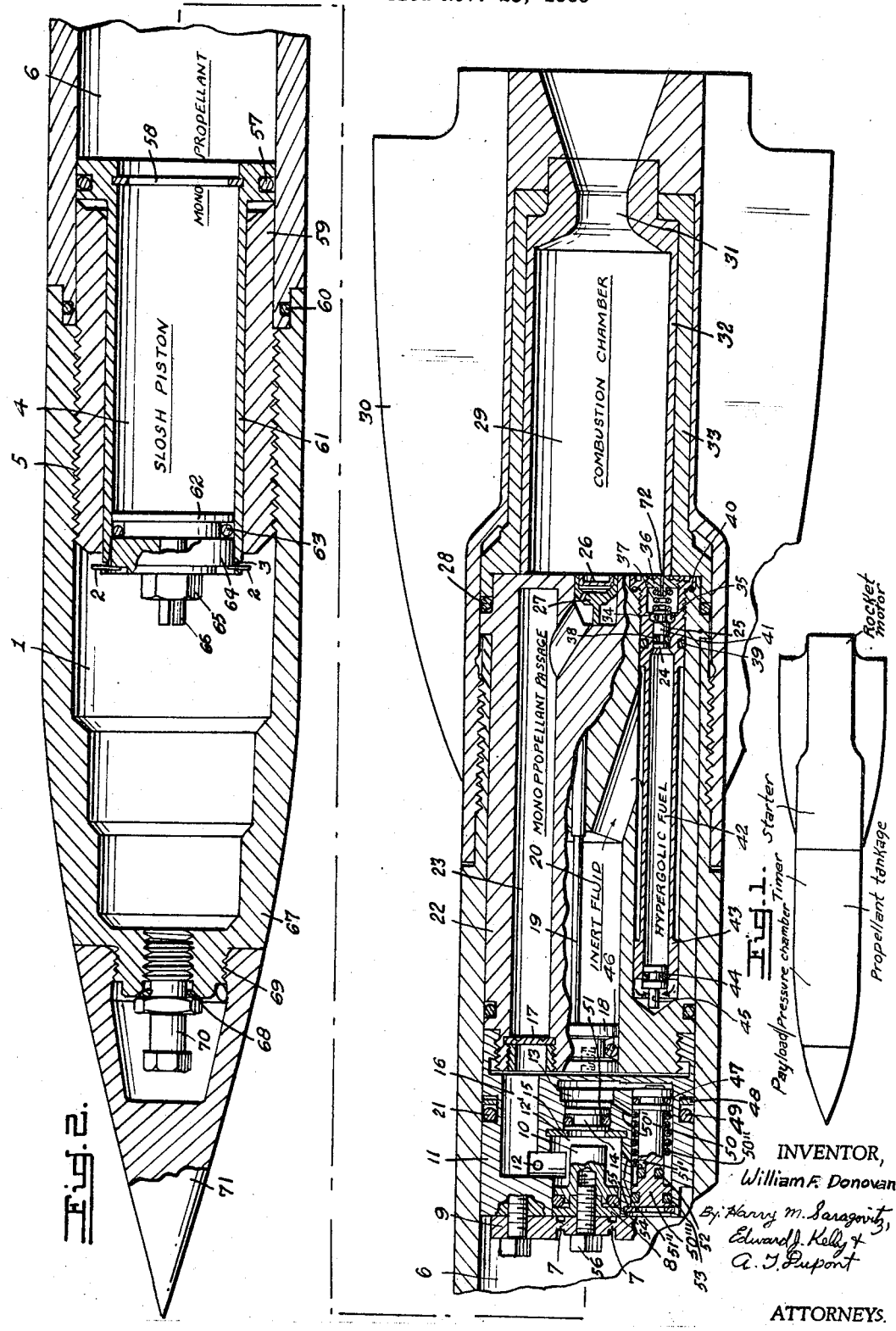

3,374,632
LIQUID PROPELLANT ROCKET
William F. Donovan, Aberdeen, Md., assignor to the United States of America as represented by the Secretary of the Navy
Filed Nov. 23, 1965, Ser. No. 510,157
6 Claims. (Cl. 60—259)

ABSTRACT OF THE DISCLOSURE

The rocket-projectile is fired from a gun and inertia during acceleration sets a timer into operation. After a pre-determined time-delay a monopropellant from cavity 6 and a hypergolic fuel from cavity 42 are forced into combustion chamber 29 where ignition and burning occur to generate thrust.

---

The present invention is directed to a rocket system utilizing liquid fuel. The system is reliable in operation yet relatively simple and inexpensive to manufacture, assemble and prepare for use. The invention may be used, for example, in gun-boosted rocket projectiles.

Difficulty with solid propellant gun-boosted rockets in preventing cracked grain and subsequent explosion on ignition leads to reconsideration of liquid propellants as motive power for gun-launched weapons. Liquid systems are usually more mechanically complicated than solid systems but, in production quantities, the propellants are often cheaper to manufacture. The economic basis for comparison, therefore, depends on the quantities involved and the particular application. For the gun-boosted weapon, it appears that the structural disadvantage of the solid propellant vehicle makes the liquid propellant rocket a better choice.

The present invention relates to a gun-boosted liquid propellant rocket with hypergolic ignition and a hydraulic timer to bring about ignition at a predetermined time after the rocket is fired from a gun or other launcher. It is completely self-contained and is not amenable to the danger of accidental destruction by either static electricity or stray electric currents, whether electromagnetically or electrodynamically induced.

In the drawing:
FIG. 1 is a diagram of the entire rocket-projectile; and
FIG. 2 is a cross-sectional view through the invention.

For convenience of reference the following is a list of parts used in the description.

1 pressurization chamber
2 internal spring lock pins
3 groove
4 filling passage in piston
5 threads
6 monopropellant fluid cavity
7 weakened areas
8 back ring on piston 10
9 breakaway bar
10 power piston
11 housing
12 port
12' cavity
13 timer fluid chamber
14 dashpot timer piston
15 snap ring
16 timer passage
17 burst disc
18 buffer piston
19 piston rod
20 cavity
21 O-ring
22 starter body
23 passage
24 cylinder shoulder
25 cylinder shoulder
26 cap
27 injector
28 metal O-ring
29 combustion chamber
30 fin cylinder
31 nozzle
32 sleeve liner
33 sleeve retainer
34 groove
35 balls
36 cap
37 spring
38 O-ring
39 O-ring
40 metal ring
41 check valve
42 hypergolic fuel cavity
43 fuel cell
44 O-ring
45 piston
46 O-ring
47 O-ring
48 O-ring
49 O-ring
50 restrictor
50' passage
50" capillary tube
50''' spool
51 O-ring
51' passage
51" passage
52 O-ring
53 O-ring
54 O-ring
55 snap ring
56 bolts
57 O-ring
58 snap ring
59 body
60 O-ring
61 slosh piston
62 filler piston
63 O-ring
64 ring
65 nut
66 slotted stud
67 forward body section
68 O-ring
69 threads
70 filler valve
71 nose
72 orifice This invention consists of a payload-pressurization chamber 1 and 67 to 71; propellant tankage 2 to 6 and 57 to 66; timer 7 to 16 and 47 to 56; starter 17 to 28 and 34 to 46, 72; and rocket motor 29 to 33. The complete operating sequence is as follows:

ASSEMBLY AND LOADING

Hydraulic timer

The timer is assembled by filling the cavity 13 with an inert fluid of appropriate viscosity to provide a time delay. The restrictor 50 is inserted into its cavity and snap ring 55 installed. The dashpot timer piston 14 is pressed in and locked by snap ring 15. The power piston 10 is then positioned and the lock 9, 56 installed. The power piston is made in two pieces to allow easy fitting of the Teflon (or equal) O-ring 54. Full stretching of the ring over the OD of the piston is not required since the ring slides easily over the groove diameter and is locked into position by the back ring 8 which forms one wall of the groove. For prevention of movement in either direction, the breakaway bar 9 is attached to both the piston 10 and the housing 11 by bolts 56.

Starter

Hypergolic fuel (UDMH) is loaded into the starter sleeve cavity 42 after assembly of the fuel cell 43 and check valve 41. Upon filling and with allowance for ullage (air), this unit is screwed into the started body 22 with piston 45 in position. O-ring 39 seals the opening and metal ring 40 provides protection against hot gas leaking into the space. Cap 36 and spring 37, in conjunction with balls 35 and groove 34 hold the check valve 41 in place. An inert fluid is then loaded into cavity 20 and piston 18 and piston rod 19 installed. Caps 26 and burst disc 17 are pressed into position and the entire assembly is fixed to the hydraulic timer by threads. Sealing of the starter-timer assembly is provided by O-rings 21 and 48, 49.

Combustion chamber

The combustion chamber 29 is built up from a combination fin cylinder 30, sleeve retainer 33, sleeve liner 32 and nozzle 31. It forms the aft end of the projectile and provides stabilization for the vehicle. It is attached to the body 59, into which has been inserted the starter-timer subassembly and the slosh piston 61 by threaded connections. Sealing is accomplished by metal O-ring 28.

Propellant tankage

Monopropellant is introduced into cavity 6 through opening 4. The filler piston 62 then closes the slosh piston 61 which is prevented from depressing into the cylinder by a snap ring in groove 3. A nut 65 holds the back ring 64 and the slotted stud 66 allows tightening of the nut. Movement out of the cylinder is prevented by snap ring 58 and internal spring pins inserted at 2. The snap ring in groove 3 is removed after the subassembly is complete. Sealing is by O-rings 57 and 63.

Pressurization

Upon fixing the forward body 67 by threads 5 into which attaches filler valve 70, the operating pressure can be introduced. The pressure required is determined by the operating characteristics of the propellant, the volume of the chamber and the specified duration of the rocket thrust. O-rings 60 and 68 prevent leakage of the pressurizing gas. After pressurizing, the nose 71 is attached by threads 69.

OPERATION

In bore

After loading, the vehicle is installed in the gun and the gun is fired. The set back forces then initiate the following sequence of events. Hydraulic pressure within the propellant tankage 6 operating on the power piston 10 of the timer fractures the breakaway bar 9 at the weakened sections 7. Independently, the hydrostatic pressure generated by the starter-buffer fluid in passage 20 and tube cavity 42 forces piston 41 down, allowing the locking balls 35 to eject from groove 34 and compressing spring 37. No starter fluid escapes since O-ring 38 does not clear shoulder 25.

In flight

As the projectile leaves the muzzle the explosion propulsive force diminishes and air resistance slows the projectile. Thus, a reversal of inertia forces occurs and the vehicle—constituting all of its fluid and solid particles—experiences a decelerating influence. Within the starter body, piston 41 is forced up through cylinder 24, 25 by the combination of spring action and reversed $g$ forces. Ullage (air space) in 42 allows the piston 41 to clear shoulder 24. No fluid flows since the pressurization has not yet reached the buffer piston 18 via the timer passage 16. Pressurization of the propellant through the slosh piston 61 forces the power piston 10 of the timer to operate on the timer piston 14. The force is transferred from the timer piston to the timer fluid in 13 which starts to flow through passage 50' to the restrictor 50. Restrictor 50 is essentially a length of capillary tubing 50" wrapped around a spool 50'''. Fluid flows out from tubing 50" at 51' and through passage 51" into cavity 12'. The O-ring 52 acts as a pressure relief valve to allow thermal expansion of the fluid in storage but to prevent excessive of leakage. O-rings 47, 51, 53 prevent by-passing of the timer fluid. As the power piston 10 is depressed in cavity 12' it uncovers port 12. The monopropellant (under pressure) can then flow through passage 16 and operate on buffer piston 18 and burst disc 17. The burst disc 17 is designed to rupture at a pressure slightly lower than that required to develop a full flow of starter fluid through orifice 72 into combustion chamber space 29. The monopropellant is isolated from the hypergolic fluid by the inert buffer fluid in 20 and the O-rings 44 and 46. Pressurization of the buffer piston 18 moves buffer fluid through the cavity 20 and the annular recess formed by 22 and 43 to produce motion of piston 45. Thus a comparatively low velocity spray of starter fluid is introduced into the combustion chamber while the monopropellant is flowing through passage 23. Upon reaching injector 27 (microsec.), the monopropellant fluid flow resistance is sharply increased and additional pressure is then available to increase the flow velocity of the hypergolic starter fluid in 42 through orifice 72. Combustion occurs as the monopropellant sprays through injector 27 and blows off cap 26. The hot gas is forced through nozzle 31 providing thrust in a well known manner.

From the foregoing it will be noted that this is a completely hydropneumatic system. It is independent of auxiliary electric power supplies and eliminates the difficulty of pyrotechnics in high $g$ environment. Aside from the direct application to gun-boosted rocketry, the same functions can be accomplished in launching torpedoes. The advantage in dissociating this system from electric operation lies in the improved safety features and relaxation of some maintenance (battery) requirements. Where complete isolation of internal propellants is desired, further improvements and simplifications can be introduced to eliminate O-ringed pistons by the substitution of integral burst discs.

What is claimed is:

1. Rocket propulsion apparatus comprising, in combination, a rocket casing inclosing tankage for a monopropellant, a pressure chamber in said rocket casing, means connecting said pressure chamber to said tankage to eject the monopropellant therefrom, a starter including a hypergolic fuel cavity in said rocket casing, ejection means to eject fuel from said cavity, timer means in said rocket casing, means connecting said timer means to said ejection means, initiation apparatus for setting said timer means into operation, a combustion chamber in said rocket casing into which monopropellant and hypergolic fuel are injected, said timer device comprising a first piston device in a cylinder, said first piston device being subject to pressure in said tankage, fracturable means securing said first piston against movement until pressure in said tankage exceeds a predetermined value, a second piston device of a dashpot engageable by said first piston device, means to retard movement of said second piston, and port means normally closed by said first piston and uncoverable as said first piston is moved to permit flow of monopropellant fluid out from said tankage.

2. Rocket propulsion apparatus comprising, in combination, a rocket casing inclosing tankage for a monopropellant, a pressure chamber in said rocket casing, means connecting said pressure chamber to said tankage to eject the monopropellant therefrom, a starter including a hypergolic fuel cavity in said rocket casing, ejection means to eject fuel from said cavity, timer means in said rocket casing, means connecting said timer means to said ejection means, initiation apparatus for setting said timer means into operation, a combustion chamber in said rocket casing into which monopropellant and hypergolic fuel are injected, said starter comprising a fluid passage leading from said timer to said rocket motor, a burst device in said passage, an injector for injecting fluid monopropellant into said rocket motor, and starter further comprising a cavity for hypergolic fuel which is hypergolic with respect to said monopropellant, ejection means actuable by pressurized fuel, when released from said tankage by said timer device, to eject said hypergolic fuel into contact with said monopropellant for combustion in said rocket motor, said ejection means comprising a first cylinder containing an inert fluid, a first piston in said first cylinder subject to pressure from said tankage when released by said timer device, a second cylinder containing said hypergolic fuel, a second piston in said second cylinder, passage means interconnecting said first cylinder and said second cylinder whereby tankage pressure on said first piston exerts a pressure on said inert fluid and said second piton thereby also pressurizing said hypergolic fuel for ejection into said combustion chamber.

3. Rocket propulsion apparatus comprising, in combination, a rocket casing inclosing tankage for a monopropellant, a pressure chamber in said rocket casing, means connecting said pressure chamber to said tankage to eject the monopropellant therefrom, a starter including a hypergolic fuel cavity in said rocket casing, ejection means to eject fuel from said cavity, timer means in said rocket casing, means connecting said timer means to said ejection means, initiation apparatus for setting said timer means into operation, a combustion chamber in said rocket casing into which monopropellant and hypergolic fuel are injected, said starter means comprising a cylinder containing hypergolic fuel, means to eject said hypergolic fuel through valve means to said rocket motor, said valve means comprising a cylindrical cavity, a cylindrical check valve device in said cavity, spring means to urge said check valve in one direction, automatically releasable restraining means restraining the valve against movement in said one direction the inertia of said valve device being sufficient to overcome the force of said spring during normal acceleration of said rocket at which time said restraining means is automatically released, relative deceleration of said rocket reacting on said valve to cause it to open and permit ejection of said hypergolic fuel to said rocket motor.

4. Apparatus as in claim 1 wherein said tankage comprises a telescoping hollow piston-cylinder arrangement, said piston-cylinder arrangement comprising an outer cylindrical fluid cavity, a cylindrical hollow slosh piston slidable in said cylindrical cavity and sealingly engaging said cylindrical cavity, a filler piston inside of and sealingly engaging said cylindrical hollow slosh piston, said pressure chamber being in communication with said filler piston to force said piston-cylinder arrangement to telescope together to thereby eject fluid propellant from the interior thereof.

5. Apparatus as in claim 4 and a member attached to said cylindrical slosh piston to limit movement of said filler piston therethrough such that said filler piston, upon approaching the end of said slosh piston, engages said member and forces said slosh piston to telescope into said outer cylindrical cavity.

6. Apparatus as in claim 2 and a cap covering said injector and adapted to be blown off as pressurized fluid monopropellant is introduced into said fluid passage.

References Cited
UNITED STATES PATENTS

| | | | |
|---|---|---|---|
| 3,011,312 | 12/1961 | Black | 60—259 |
| 3,105,356 | 10/1963 | Hamilton | 60—39.48 |
| 3,229,463 | 1/1966 | Smith | 60—259 |
| 2,470,489 | 5/1949 | Hopkins | 102—49.8 |
| 3,135,161 | 6/1964 | Oyhus | 89—1.818 |

CARLTON R. CROYLE, *Primary Examiner.*

MARK NEWMAN, *Examiner.*

D. HART, *Assistant Examiner.*

UNITED STATES PATENT OFFICE
CERTIFICATE OF CORRECTION

Patent No. 3,374,632 March 26, 1968

William F. Donovan

It is certified that error appears in the above identified patent and that said Letters Patent are hereby corrected as shown below:

In the heading to the printed specification, line 5, "Secretary of the Navy" should read -- Secretary of the Army.

Signed and sealed this 12th day of August 1969.

(SEAL)
Attest:

Edward M. Fletcher, Jr.　　　　　　　　　　WILLIAM E. SCHUYLER, JR.
Attesting Officer　　　　　　　　　　　　　　Commissioner of Patents